Jan. 29, 1924.

W. D. GIBSON 1,482,126

COMBINED MEASURING AND DISPENSING DEVICE

Filed March 30, 1922

INVENTOR
William D. Gibson
BY
Frank Warren
ATTORNEY

Patented Jan. 29, 1924.

1,482,126

UNITED STATES PATENT OFFICE.

WILLIAM D. GIBSON, OF SEATTLE, WASHINGTON, ASSIGNOR OF ONE-HALF TO FRANK W. McCAFFREY, OF SEATTLE, WASHINGTON.

COMBINED MEASURING AND DISPENSING DEVICE.

Application filed March 30, 1922. Serial No. 548,013.

*To all whom it may concern:*

Be it known that I, WILLIAM D. GIBSON, a citizen of the United States, residing at Seattle, in the county of King and State of Washington, have invented a certain new and useful Improvement in Combined Measuring and Dispensing Devices, of which the following is a specification.

My invention relates to improvements in combined measuring and dispensing devices for solid matter of any form that is divided into small particles which will flow freely and the object of my invention is to provide means that may be removably disposed within a container and that will measure and discharge a desired quantity of material each time the container is turned from an upright into a discharging position.

A further object is to provide measuring and discharging means of simple and efficient construction that may be quickly and easily removed from the container for the purpose of cleaning the same or to permit the container to be used without the measuring device.

Other and more specific objects will be apparent from the following description taken in connection with the accompanying drawings.

The device herein disclosed is especially designed for use on dining tables as a measuring dispenser for granulated sugar and in this capacity is valuable because it is sanitary, economical and convenient, but it will be understood that the device is susceptible to many other uses.

I accomplish these objects by devices illustrated in the accompanying drawings wherein—

Figure 1:
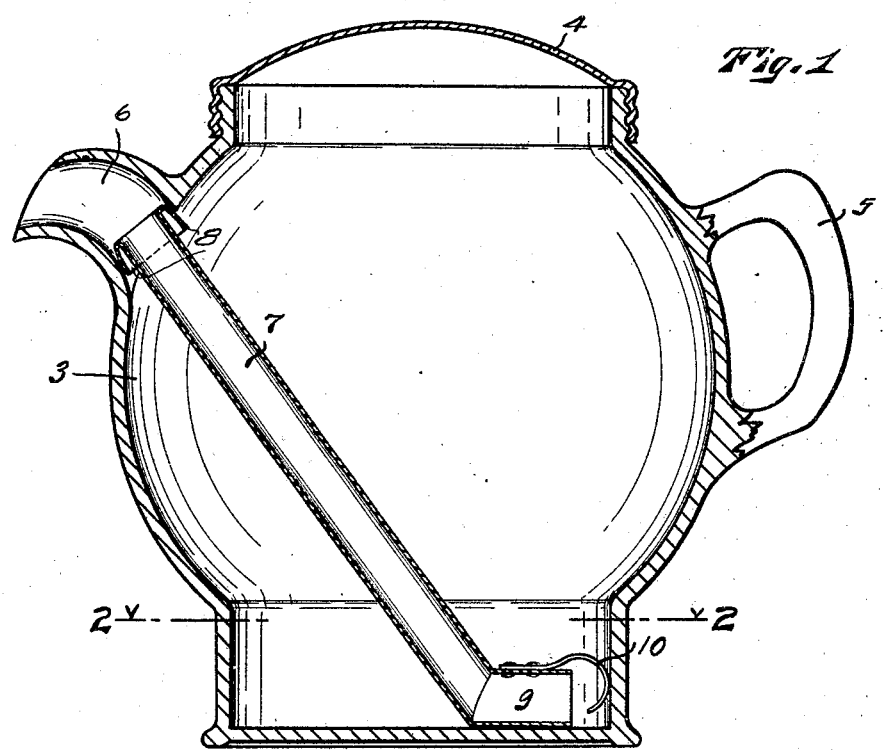
Figure 2:
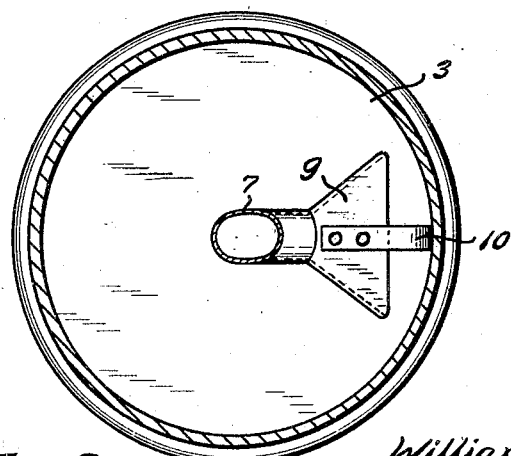

Figure 1 is a view in vertical mid-section of a container having a measuring and dispensing device constructed in accordance with my invention; and Fig. 2 is a sectional plan view of the same substantially on broken line 2, 2 of Fig. 1 showing parts of the measuring device.

Referring to the drawings, throughout which like reference numerals indicate like parts, the numeral 3 designates a container provided with a removable cover 4 and having on one side, a handle 5 and on the opposite side a spout or discharge nozzle 6.

The measuring and dispensing device proper comprises a tube 7 having, at its upper end, outwardly and rearwardly bent spring members 8 that are arranged to fit within the opening formed by the spout 6 and having at its lower end a flared portion 9 that is arranged at such an angle with respect to the tube 7 as to rest squarely upon the flat bottom of the receptacle 3.

The flared portion 9 has a spring 10 secured thereto that projects to the rear of said flared portion and is arranged to engage with the wall of the container 3 to hold the rear end of the flared portion 9 at a distance from the wall of the container and to keep the upper end of the tube 7 pressed firmly and securely up into the opening of the spout 6.

The tube 7 shown in the drawings is cylindrical in form but it will be understood that the tube may be made of any shape and that the container may also be made of any shape so long as it affords an opening communicating with the end of the tube 7, a bottom on which the flared portion 9 may rest and a wall with which the spring 10 may engage.

In operation when the material, as sugar or other granulated, crystallized, powdered, or finely divided solid matter is placed in a container which is provided with the measuring and dispensing device a certain amount of the material will immediately enter and fill the flared bottom portion 9 of the tube and the space to the rear of said flared bottom portion.

When the container is tilted into what would normally be a pouring position the measured amount of material that has entered the flared portion 9 is discharged through the tube 7 and spout 6 but no more material will be discharged until the container is again turned into an upright position to permit the flared portion 9 to again be filled.

If the flared portion 9 holds an amount equal to a teaspoonfull of sugar then a teaspoonfull of sugar will be discharged every time the container is turned into a pouring position.

The spring member 8 at the upper end of the tube 7 is preferably formed by slitting the end of the tube and then bending the same rearwardly. The rearwardly bent portions 8 prevent the escape of any material around the exterior of the tube.

The device is sanitary because it prevents the entrance of dirt in all forms, protects the contents from flies and prevents the contamination of the contents by the use of spoons that are not clean and sanitary. It is economical because it tends to prevent persons from using an excess amount of sugar, prevents the spilling of liquids in the sugar, and will not spill the sugar if the container is tipped over. It is convenient for the user because it relieves him of the necessity of using a spoon and at the same time enables him to obtain a measured amount of sugar.

The foregoing description taken in connection with the accompanying drawings clearly disclose the plan of construction and method of operation of this device, but, while I have shown and described what I now consider to be the preferred embodiment of my invention it will be understood that the drawings and description are merely illustrative and that such changes may be made as are within the scope and spirit of my invention.

What I claim is:

The combination with a container having a spout, of a removable tube having rearwardly bent resilient means disposed on the upper end and arranged to fit snugly within said spout, said tube being arranged to extend downwardly at an angle toward the opposite wall of said container, a flared measuring device arranged on the bottom end of said tube to rest upon the bottom of said container, and resilient means disposed upon said flared portion and adapted to engage with the wall of said container to hold said flared portion in spaced relation to said wall and hold the upper end of said tube within said spout.

In witness whereof, I hereunto subscribe my name this 20th day of March A. D. 1922.

WILLIAM D. GIBSON.